Patented Mar. 22, 1932

1,850,845

UNITED STATES PATENT OFFICE

OLE A. NELSON, OF CLARENDON, VIRGINIA, ASSIGNOR, BY MESNE ASSIGNMENTS, TO HARRY W. KAYLOR, OF HAGERSTOWN, MARYLAND

COMPOSITION FOR BUILDING BLOCKS AND METHOD OF MAKING THE COMPOSITION

No Drawing.  Application filed July 22, 1929.  Serial No. 380,256.

This invention relates to a composition for building blocks and method of making the composition.

The primary object of the invention is to provide, in a manner as hereinafter set forth, a new and improved composition suitable for molding into building blocks, tile, partition board, and the like, by means of which articles of such class may be produced which are sufficiently strong for their intended purposes, extremely light in weight, fireproof, sound absorbing, and which are adapted to be sawed or drilled.

A further object of the invention is to provide a composition for building blocks and the like which is formed in a manner to permit the use of a maximum proportion of cheaper ingredients whereby a finished article of high quality may be produced at a minimum of expense.

In carrying out the invention, use is made of diatomaceous earth or kieselguhr, hydrated lime, and a binder which may be any one or more of a number of suitable ingredients as set forth in the following examples.

|  |  | Per cent |
|---|---|---|
| First example: | Diatomaceous earth | 84 |
|  | Hydrated lime | 14 |
|  | Rosin or rosinous gum | 2 |
| Second example: | Diatomaceous earth | 84 |
|  | Hydrated lime | 14 |
|  | Finely divided sulphur | 2 |
| Third example: | Diatomaceous earth | 84 |
|  | Hydrated lime | 14 |
|  | Magnesium fluosilicate | 2 |
| Fourth example: | Diatomaceous earth | 84 |
|  | Hydrated lime | 14 |
|  | Calcium chloride | 2 |

The method employed in producing a composition in accordance with one of the foregoing examples consists essentially in grinding together the hydrated lime and binder with a small quantity of the diatomaceous earth mixed with water until the resulting product is of soft creamy consistency and contains a plurality of particles approaching the sizes of colloids. Then the remainder of the moist diatomaceous earth is mixed in by any suitable means and the resulting plastic mass is then molded into the required shape under a pressure of from approximately 200 pounds to 600 pounds per square inch, depending on the hardness and density required. The molded product is then processed with steam at a pressure of approximately 150 pounds for from 3 to 8 hours.

In grinding together the hydrated lime and binder with a small quantity of diatomaceous earth to produce the product of soft creamy consistency above-mentioned, preferably two parts of the lime and binder are used with one part of the diatomaceous earth.

It is generally known that hydrated lime and silica or silicic acid combines to produce a silicate of calcium. I have found however that by adding rosin, sulphur, magnesium fluosilicate, or calcium chloride, according to the examples given above, a plastic mass is obtained which when molded into building blocks and processed with steam produces a product superior to that in which only lime and diatomaceous earth are used.

The foregoing examples have been found to produce satisfactory results, but it is to be understood that such examples are to be taken as illustrative rather than limitative, and that the proportions of the ingredients given in the examples may be varied as desired. For instance the amount of lime used may be reduced to from 9 to 10% of the whole and the binder to approximately 1% of the whole without materially lowering the quality of the finished article and without deviating from the spirit of the invention.

What I claim is:

1. A method of producing a plastic mass consisting of grinding together hydrated lime and a binder with a small quantity of diatomaceous earth until the resulting product is of soft creamy consistency, then mixing with said product a relatively large quantity of diatomaceous earth until the aggregate mixture is uniform throughout.

2. A method of producing a plastic mass consisting of grinding together substantially two parts of hydrated lime and a binder with one part of diatomaceous earth until the resulting product is of soft creamy consistency, then mixing with the resulting product a relatively large quantity of diatomaceous earth until the aggregate mixture is uniform throughout.

3. A method of producing a building block consisting of grinding together hydrated lime and a binder with a small quantity of diatomaceous earth until the resulting product is of soft creamy consistency, then mixing with said product a relatively large quantity of diatomaceous earth to provide a plastic mass of uniform texture throughout, then molding the plastic mass into the desired shape, and then processing the molded product with steam.

4. A method of producing a green building block consisting of grinding together hydrated lime and a binder with a small quantity of diatomaceous earth until the resulting product is of soft creamy consistency, then mixing with said product a relatively large quantity of diatomaceous earth to provide a plastic mass of uniform texture throughout, and then molding the plastic mass into the desired shape.

5. A method of producing a building block consisting of grinding together hydrated lime and a binder with a small quantity of diatomaceous earth until the resulting product is of soft creamy consistency, then mixing with said product a relatively large quantity of diatomaceous earth to provide a plastic mass of uniform texture throughout in which diatomaceous earth constitutes at least 84% of the whole, then molding the plastic mass, and then processing the molded mass with steam.

6. A method of producing a building block consisting of grinding together 14 parts of hydrated lime and two parts binder with eight parts diatomaceous earth until the resulting product is of soft creamy consistency, then mixing with said product seventy-six parts diatomaceous earth to provide a plastic mass of uniform texture throughout, then molding the plastic mass, and then processing the molded mass with steam.

7. A method of producing a composition consisting of grinding together hydrated lime and a binder with a small quantity of diatomaceous earth until the resulting product is of soft creamy consistency containing particles approaching the sizes of colloids, then mixing with said product a relatively large quantity of diatomaceous earth until the aggregate mixture is uniform throughout.

8. A method of producing a composition consisting of grinding together substantially two parts of hydrated lime and a binder with one part of moist diatomaceous earth until the resulting product is of a soft creamy consistency containing particles approaching the sizes of colloids, then mixing with the resulting product a relatively large quantity of moist diatomaceous earth until the aggregate mixture is uniform throughout.

9. A method of producing a composition consisting of grinding hydrated lime, a binder, and a quantity of diatomaceous earth into a uniform mixture, then mixing with said uniform mixture a further quantity of diatomaceous earth until the aggregate mixture is uniform throughout.

10. A composition comprising the combination, in the form of a mixture, of diatomaceous earth, with a finely ground sub-mixture of diatomaceous earth, hydrated lime, and a binder.

11. A composition comprising the combination, in the form of a mixture, of diatomaceous earth, with a finely ground sub-mixture of diatomaceous earth, hydrated lime, and a binder, said binder including finely divided sulphur.

12. A composition comprising the combination, in the form of a mixture, of diatomaceous earth, with a finely ground sub-mixture of diatomaceous earth, hydrated lime, and a binder, said binder including magnesium fluosilicate.

13. A composition comprising the combination, in the form of a mixture, of diatomaceous earth, with a finely ground sub-mixture of diatomaceous earth, hydrated lime, and a binder, said binder including calcium chloride.

14. A composition comprising the combination, in the form of a mixture, of diatomaceous earth, with a finely ground sub-mixture of diatomaceous earth, hydrated lime, and a binder, the diatomaceous earth in said composition constituting substantially 84% of the whole.

15. A composition comprising the combination, in the form of a mixture, of diatomaceous earth, with a finely ground sub-mixture of diatomaceous earth, hydrated lime, and a binder, the ingredients of the composition being used substantially in the proportion of 84% diatomaceous earth, 14% hydrated lime, and 2% binder.

16. A composition comprising the combination, in the form of a mixture, of pure diatomaceous earth, with a finely ground sub-mixture including a binder and diatomaceous earth wherein a portion of the diatoms have been disintegrated.

17. A composition for building blocks and the like, comprising diatomaceous earth, hydrated lime, and calcium chloride.

In testimony whereof I affix my signature hereto.

OLE A. NELSON.